United States Patent [19]

Hailey et al.

[11] Patent Number: 5,546,193
[45] Date of Patent: * Aug. 13, 1996

[54] AUTOPROGRAMMED, CHANNEL MAPPING FOR A VIDEO CASSETTE RECORDER

[75] Inventors: James E. Hailey, Indianapolis; Foy E. Wilkey, Fishers; Randall D. Staggs, Carmel, all of Ind.

[73] Assignee: Thomson Consumer Electronics, Inc., Indianapolis, Ind.

[*] Notice: The term of this patent shall not extend beyond the expiration date of Pat. No. 5,532,832.

[21] Appl. No.: 306,848

[22] Filed: Sep. 15, 1994

Related U.S. Application Data

[63] Continuation of Ser. No. 695,026, May 2, 1991, abandoned.

[51] Int. Cl.⁶ .................................................... H04N 5/76
[52] U.S. Cl. ..................... 358/335; 360/33.1; 348/731; 348/725; 455/186.1
[58] Field of Search ............... 358/335; 360/33.1, 360/69, 79, 14.1; 455/186.1; 348/705, 725, 731, 732, 734; H04N 5/76

[56] References Cited

U.S. PATENT DOCUMENTS

| | | |
|---|---|---|
| 4,755,883 | 7/1988 | Uehira . |
| 4,823,387 | 4/1989 | Tults .................................. 358/193.1 |
| 4,847,696 | 7/1989 | Matsumoto et al. . |
| 4,908,713 | 3/1990 | Levine ................................. 358/335 |
| 4,963,994 | 10/1990 | Levine ................................. 358/335 |
| 4,977,455 | 12/1990 | Young . |
| 4,979,047 | 12/1990 | Wine . |
| 5,031,045 | 7/1991 | Kawasaki ........................... 358/193.1 |
| 5,056,070 | 10/1991 | Shibuya et al. . |
| 5,307,173 | 4/1994 | Yuen et al. ......................... 358/335 |
| 5,335,079 | 8/1994 | Yuen et al. ......................... 358/335 |

FOREIGN PATENT DOCUMENTS 2005070   6/1990   Canada .

OTHER PUBLICATIONS

Copy of THE COURIER TIMES, BUCKS COUNTY, PA, p. 8B, 28 May 1992.
Getting Started With VCR Plus+ (published in 1990).
VCR Plus+ Supplemental Operating Instructions (published in 1990).

*Primary Examiner*—Tommy P. Chin
*Assistant Examiner*—Khoi Truong
*Attorney, Agent, or Firm*—Joseph S. Tripoli; Peter M. Emanuel; Thomas F. Lenihan

[57] ABSTRACT

In a videocassette recorder including "VCR PLUS+™" videocassette recorder programming system capability and autoprogramming capability, it is herein recognized that the channel-mapping procedure may be greatly simplified by using the autoprogramming feature to locate and program all active channels, and then by mapping only those channels which are active, instead of requiring the user to select all 125 possible channel-programming positions.

7 Claims, 11 Drawing Sheets

AUTOPROGRAMMING CHANNEL SCAN LIST

|  |  | b7 | b6 | b5 | b4 | b3 | b2 | b1 | b0 |
|---|---|---|---|---|---|---|---|---|---|
| CHAN 7 - 1 | 0 | 0 | 1 | 0 | 1 | 0 | 0 | 0 | X |
| CHAN 15 - 8 | 1 | 0 | 0 | 1 | 0 | 0 | 0 | 1 | 0 |
| CHAN 23 - 16 | 2 | 0 | 0 | 0 | 0 | 0 | 0 | 0 | 0 |
| CHAN 31 - 24 | 3 | 0 | 0 | 0 | 0 | 0 | 0 | 0 | 0 |
| CHAN 39 - 32 | 4 | 1 | 0 | 0 | 0 | 0 | 0 | 0 | 0 |
| CHAN 47 - 40 | 5 | 0 | 0 | 0 | 0 | 1 | 0 | 0 | 0 |
| CHAN 55 - 48 | 6 | 0 | 0 | 0 | 1 | 0 | 0 | 0 | 0 |
| CHAN 63 - 56 | 7 | 0 | 0 | 0 | 0 | 0 | 0 | 0 | 0 |
| CHAN 61 - 64 | 8 | 0 | 0 | 0 | 0 | 0 | 0 | 0 | 0 |
| CHAN 79 - 72 | 9 | 0 | 0 | 0 | 0 | 0 | 0 | 0 | 0 |
| CHAN 87 - 80 | 10 | 0 | 0 | 0 | 0 | 0 | 0 | 0 | 0 |
| CHAN 95 - 88 | 11 | 0 | 0 | 0 | 0 | 0 | 0 | 0 | 0 |
| CHAN 103 - 96 | 12 | 0 | 0 | 0 | 0 | 0 | 0 | 0 | 0 |
| CHAN 111 - 104 | 13 | 0 | 0 | 0 | 0 | 0 | 0 | 0 | 0 |
| CHAN 119 - 112 | 14 | 0 | 0 | 0 | 0 | 0 | 0 | 0 | 0 |
| CHAN 125 - 120 | 15 | X | X | 0 | 0 | 0 | 0 | 0 | 0 |

| # |   |    |
|---|---|----|
| 0 | 0 | 00 |
| 1 | 0 | 01 |
| 2 | 0 | 02 |
| 3 | 0 | 03 |
| 4 | 1 | 04 |
| 5 | 0 | 05 |
| 6 | 1 | 06 |
| 7 | 0 | 07 |
| 8 | 0 | 08 |
| 9 | 1 | 29 |
| 10 | 0 | 10 |
| 11 | 0 | 11 |
| 12 | 0 | 12 |
| 13 | 1 | 13 |
| 14 | 0 | 14 |
| 111 | 0 | 111 |
| 112 | 0 | 112 |
| 113 | 0 | 113 |
| 114 | 0 | 114 |
| 115 | 0 | 115 |
| 116 | 0 | 116 |
| 117 | 0 | 117 |
| 118 | 0 | 118 |
| 119 | 0 | 119 |
| 120 | 0 | 120 |
| 121 | 0 | 121 |
| 122 | 0 | 122 |
| 123 | 0 | 123 |
| 124 | 0 | 124 |
| 125 | 0 | 125 |

AUTOPROGRAMMED, CHANNEL MAPPING FOR A VIDEO CASSETTE RECORDER

This is a continuation of application Ser. No. 07/695,026, filed May 2, 1991 now abandoned.

FIELD OF THE INVENTION

The subject application concerns the field of videocassette recorders (VCRs) and apparatus for programming them.

CROSS REFERENCE TO RELATED APPLICATIONS

The subject patent application is related to patent applications bearing U.S. patent application Ser. No. 695,025 and 694,310, filed herewith, and assigned to the same assignee as the subject invention.

BACKGROUND OF THE INVENTION

It is generally believed that many, if not the vast majority, of people are simply unable to program their VCRs to record a desired television program on a given channel, at a given time and date. VCR manufacturers have provided different programming schemes in an attempt to address this undesirable situation, with little success.

Early VCRs such as the VET 650 manufactured by RCA Corporation, Indianapolis, Ind., were programmed by means of pushbuttons mounted on the front panel of the VCR. The pushbuttons controlled the entry of time-on, time-off, date, and channel number data. Feedback was provided to the user by means of a front-panel-mounted LED (light emitting diode) display. While such systems accomplished the programming task, they were not perceived as being user-friendly.

Later VCRs such as the Panasonic model PV-4800 manufactured by Panasonic Company, Division of Matsushita Electric Corporation of America, Secaucus, N.J., provided on-screen programming in an effort to make programming the VCR a less intimidating and confusing task. Nonetheless, users may still be confused by the numerous programming steps involved.

Panasonic VCR model PV-2812 employs a bar-code reader for programming the recording of television shows. In this system, a user draws a bar-code reader across the appropriate codes printed on a bar-code sheet. This solution is considered inadequate for several reasons. First, most newspapers do not print television schedule bar-codes. Second, such printed barcode sheets tend to be relatively large pieces of paper which should be stored in a place, presumably near the VCR, where they will be readily available for programming. Third, the user must use yet another piece of equipment (i.e., the bar-code reader) in order to read-in the code for his desired television show.

When the user is a subscriber to a cable television system, his confusion concerning VCR programming may be greatly multiplied, because it is common practice in cable television systems to translate programs from their normal "air" channel to a different "cable" channel. For example, a television program broadcast on channel 29 may be received by a cable television subscriber on cable channel 09. Thus, when the channel listed in the channel guide of the local newspaper is not the channel upon which the desired television show is actually conveyed by the user's cable TV service, the VCR programming task may appear insurmountable.

Recently, a programming simplification system known as "VCR PLUS™", manufactured by Gemstar Development Corporation, Pasadena, Calif., has become available. Briefly, the apparatus of the "VCR PLUS+™" videocassette recorder programming system resembles a standard remote control handunit. The handunit is preprogrammed with the codes for controlling the VCRs and cable control boxes of many manufacturers. The handunit is then programmed by the user with a unique code comprising 1 to 8 digits, which code corresponds to a particular television show broadcast on a given channel, at a given time and date, and having a given duration. A television show which is broadcast at the most popular viewing time (for example, 7 pm) may have a code which comprises only 1 digit. Conversely, a television show which is broadcast at the least popular viewing time (for example, 3 am) may have a code which comprises the full 8 digits. These codes are printed in the channel guide section of the viewer's local newspaper along with the normal time and channel information. After entering the unique 1 to 8 digit code for a particular television show to be recorded, the user places the handunit in a cradle mounted on his VCR to ensure that the handunit is in the proper orientation for transmitting data to the IR (infrared) receiver of the VCR. At the proper time, the "VCR PLUS+™" videocassette recorder programming handunit transmits IR codes to the VCR to turn it on and program it to record the desired television show.

While at first glance, it appears that the "VCR PLUS+™" videocassette recorder programming system solves the consumer's VCR-programming confusion problem, a significant problem remains. If the user is a cable television subscriber, the "VCR PLUS+™" videocassette recorder programming system has no way of knowing which broadcast channels are assigned to which cable channels of the user's particular cable service. Thus, to use the same example as given above, a user who is a cable television subscriber must perform a channel-mapping procedure to inform the "VCR PLUS+™" videocassette recorder programmer handunit that channel 29 is actually received on cable channel 09. The "VCR PLUS+™" videocassette recorder programming system provides a method of selecting each of its channel-programming positions to effect this one-time channel-mapping procedure. However, the task of selecting each position for channel-mapping is in itself somewhat confusing and time-consuming.

SUMMARY OF THE INVENTION

In a videocassette recorder including "VCR PLUS+™" videocassette recorder programming system capability and autoprogramming capability, it is herein recognized that the channel-mapping procedure may be greatly simplified by using the autoprogramming feature to locate and program all active channels, and then by mapping only those channels which are active, instead of requiring the user to select all 125 possible channel-programming positions.

BRIEF DESCRIPTION OF THE DRAWING

FIG. 5 shows blocks of memory locations of the EEPROM of FIG. 1, according to the subject invention.

DETAILED DESCRIPTION OF THE EMBODIMENT

Figure 1:
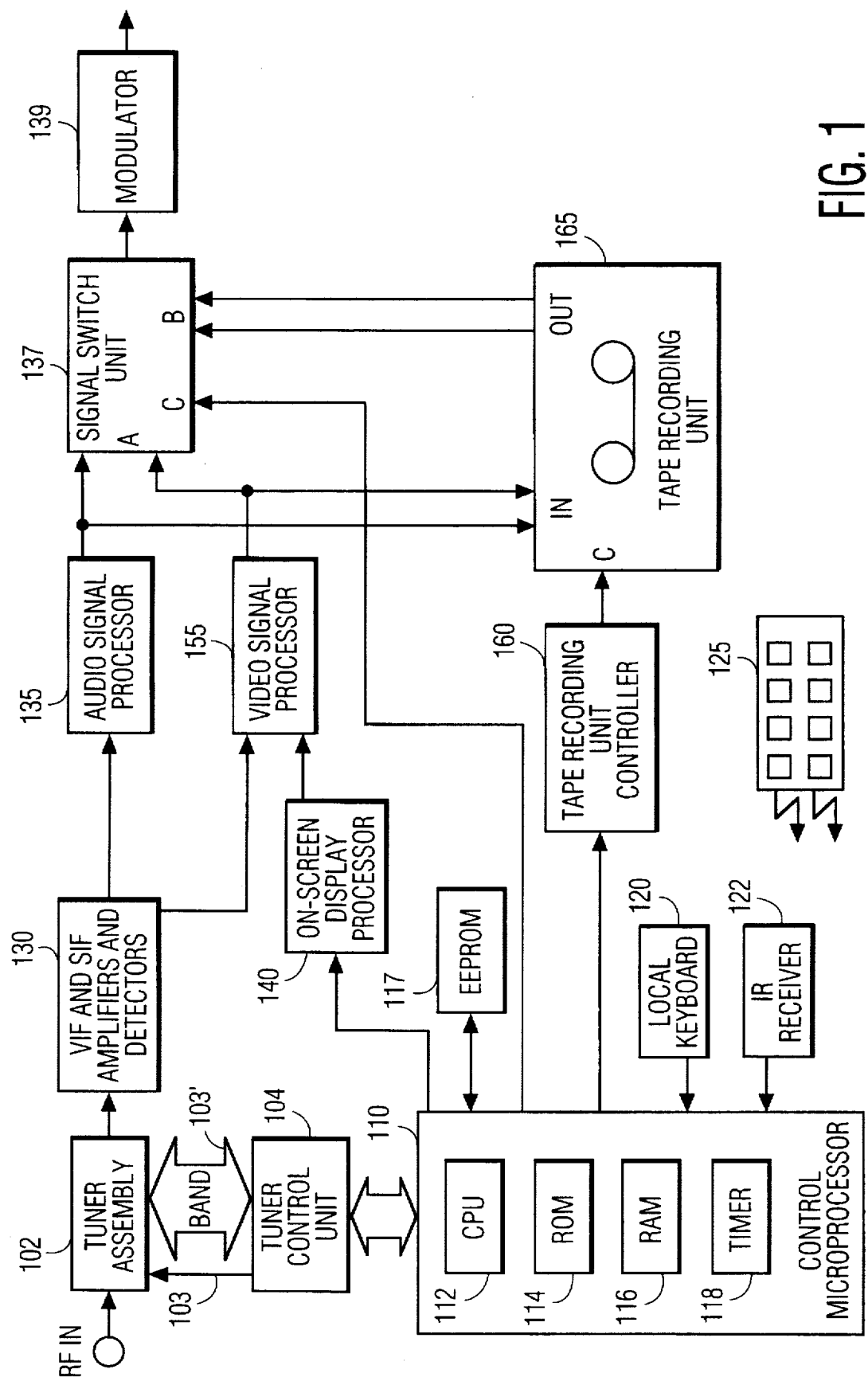
FIG. 1 shows, in block diagram form, a VCR incorporating the subject invention.

Referring to FIG. 1, radio frequency (RF) signals are applied to an RF input terminal of a tuner assembly 102. Tuner assembly 102 selects a particular RF signal under control of a tuner control unit 104 which applies a tuning control signal to tuner assembly 102 via a wire 103, and applies band-switching signals via a control bus 103'. Tuner control unit 104 is controlled by a controller 110. Controller 110, which may be a microprocessor or microcomputer, includes a central processing unit (CPU) 112, a read-only memory (ROM) 114, a random access memory 116, and an external electrically-erasable read only memory (EEPROM) 117. Controller 110 generates a control signal for causing tuner control unit 104 to control tuner 102 to select a particular RF signal, in response to user-entered control signals from a local keyboard 120 and from an infrared (IR) receiver 122. IR receiver 122 receives and decodes remote control signals transmitted by a remote control unit 125.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a baseband composite video signal (TV), and a sound carrier signal. The sound carrier signal is applied to an audio signal processor unit 135 which includes an audio detector and may include a stereo decoder. Audio signal processor unit 135 produces baseband audio signals and applies them to a signal switch unit 137.

The baseband video signal (TV) is coupled to a video processor unit 155 and is also applied to signal switch unit 137. Video and audio signals are also applied to a tape recorder unit 165 which causes the signals to be recorded onto video tape. Tape recorder unit 165 has a control input and operates under control of a tape recorder unit controller 160, which may be a microprocessor. Tape recorder unit controller 160 is in turn controlled by control signals from controller 110. Under control of controller 110, an on-screen display processor 140 generates character signals, and applies them to a second input of video signal processor 155, for inclusion in the processed video signal. Signal switch unit 137 is controlled by controller 110 via a control input terminal C to select audio and video signals from audio signal processor 135 and video signal processor 155, or from the output terminals of tape recording unit 165 in the playback mode, and to apply the selected signals to a modulator 139 for modulation onto a particular channel frequency carrier, typically that of channel 3 or channel 4. The circuitry described thus far is known from RCA videocassette recorder model VR520.

Unlike the RCA VR520, which has as its main programming feature a TIMER PROGRAM mode of operation, apparatus according to the subject invention includes both a TIMER PROGRAM programming feature and a VCR PLUS™ programming feature. The control program for the above-mentioned features resides in ROM 114 of controller 110. Electrically-erasable programmable read only memory (EEPROM) 117 is coupled to controller 110, and serves as a non-volatile storage element for storing autoprogramming channel data, user-entered channel data, and "VCR PLUS+ ™" videocassette recorder programming system channel mapping data.

It is herein recognized that it is a clear advantage for the unit which contains the "VCR PLUS+™" videocassette recorder programming system control code (in the subject case, the VCR) to be coupled to the television antenna line, so that the controller can determine which channels are active. By displaying only the active channels, consumer confusion regarding the channel mapping task is reduced due to shortening of the channel mapping list by elimination of those channels which are inactive.

The present invention will be described with reference to FIGS. 2, and 3a through 3n. With respect to FIGS. 3a through 3n, assume that a VCR according to the present invention is coupled to a television set 300a–300n, having a picture tube 310a–310n, respectively. FIG. 3a shows a display screen displayed in response to the pressing of the PROGRAM key of remote control handunit 125. Note that by pressing either key 1 or key 2, the user can program a television show for recording by means of the "VCR PLUS+ ™" videocassette recorder programming system or by normal TIMER PROGRAM recording, respectively. Options 3 and 4 are standard features and need not be described here.

Figure 3A:
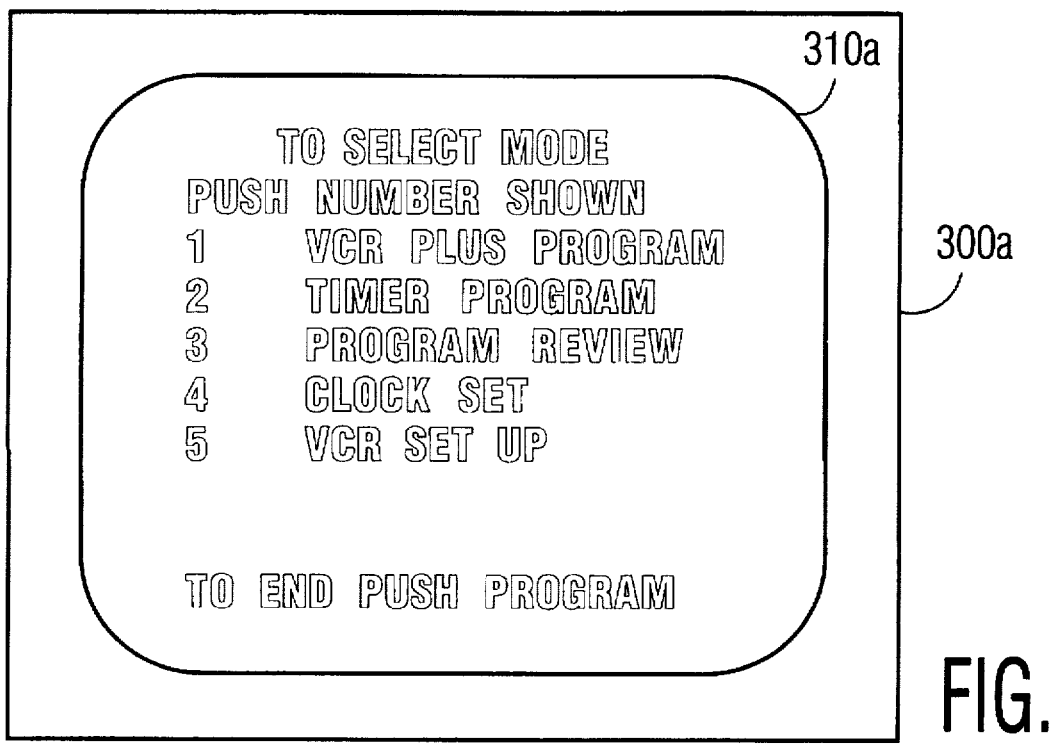
FIGS. 3a–3n are illustrations showing display screens produced in accordance with the invention.
Figure 3B:
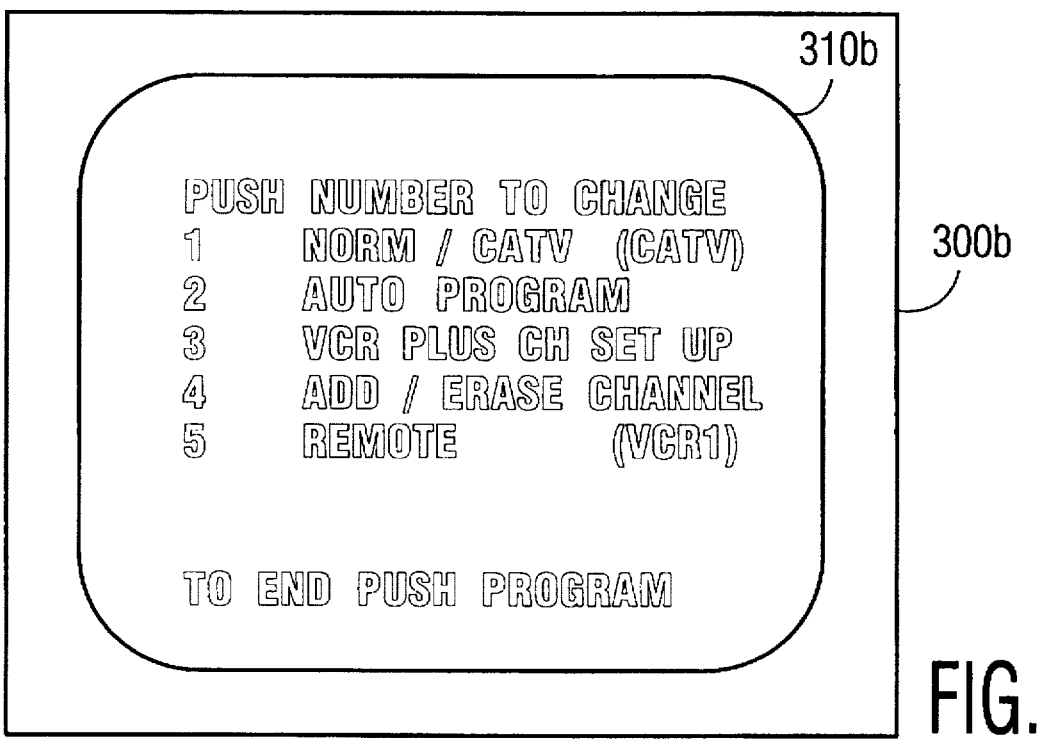

In response to the pressing of key number 5, VCR SET UP, the display screen of FIG. 3b is generated, which provides another list of 5 options. Selecting item 1 enables the user to toggle back and forth between controlling tuner 102 to tune NORMAL (i.e., broadcast or "air") and controlling tuner 102 to tune CATV (i.e., cable) frequencies. Selecting item 2 causes an AUTOPROGRAM function to be implemented in which tuner 102 is controlled to search for all active channels and compile a list of channels which are available to be tuned, and those which are inactive and are to be skipped over. The selection of menu item 4 allows a user to add a channel to the list or delete a channel from the autoprogram scan list. Menu item 5 is not relevant to the subject invention and need not be described here. Selection of menu item 3 causes the display of the screen shown in FIG. 3c.

Figure 3C:
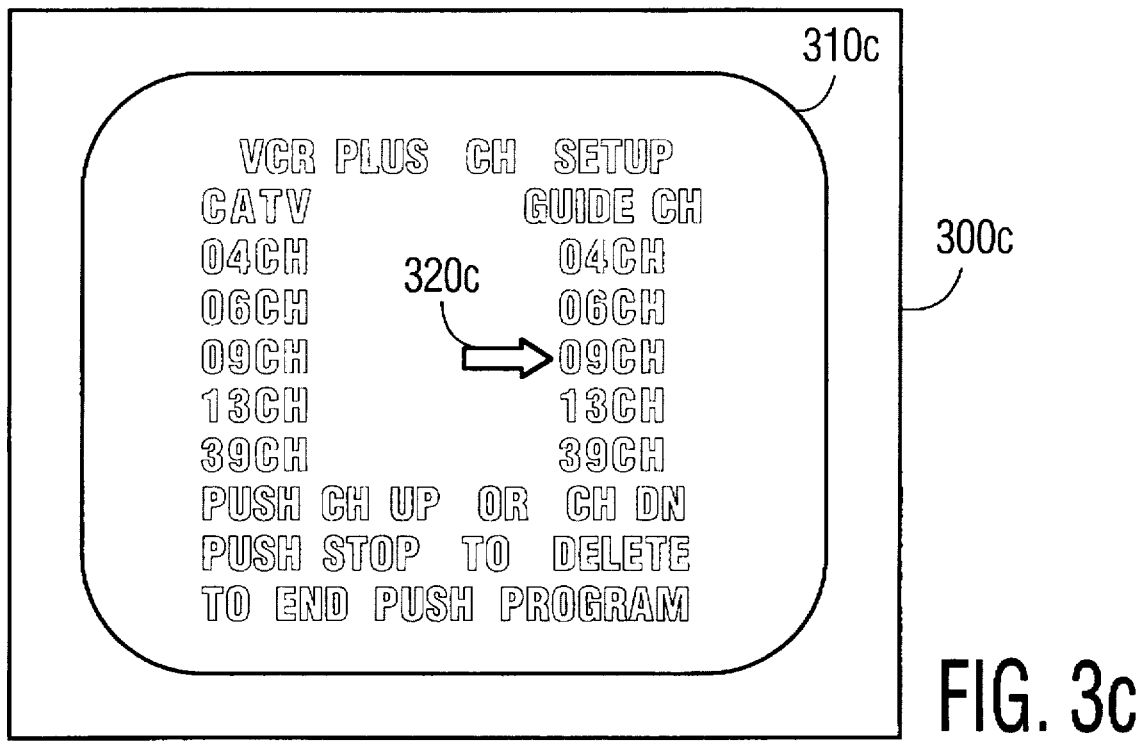

FIG. 3c shows the VCR PLUS+™ videocassette recording programming CHANNEL SET UP screen, comprising a lefthand column labelled CATV and a righthand column labelled GUIDE CHANNEL (GUIDE CH). The label CATV is present rather than the label NORMAL, because of a NORM/CATV selection made earlier with respect to the screen menu of FIG. 3b. In the particular example shown in FIG. 3c, the first 5 entries of the above-mention autoprogram list are displayed in the lefthand column. A one-for-one mapping of the active channels has produced the list shown in the righthand column. That is, the software contained in ROM 114 assumed that the television program actually received on channel 4 was a program transmitted by the broadcaster who actually broadcasts on channel 4. As a starting point, the same assumption is made for all other channels received, as shown by the one-for-one correspondence of the column entries. However, as noted above, the signal received on cable channel 09 may have actually been transmitted by the broadcaster on channel 29, and moved to the channel 09 position by the cable company. This causes the following problem. A newspaper TV listing lists a particular television show to be broadcast on a particular date, at a particular time, and on a particular channel, in this case channel 29. The "VCR PLUS+™" videocassette recorder programming system program code printed in the newspaper TV listing will, when descrambled and decoded, produce the channel guide channel number 29, not the channel guide channel number 09. Thus, some means of "mapping" the channel guide channel number 29 to the cable channel number 09 must be provided.

Figure 3D:
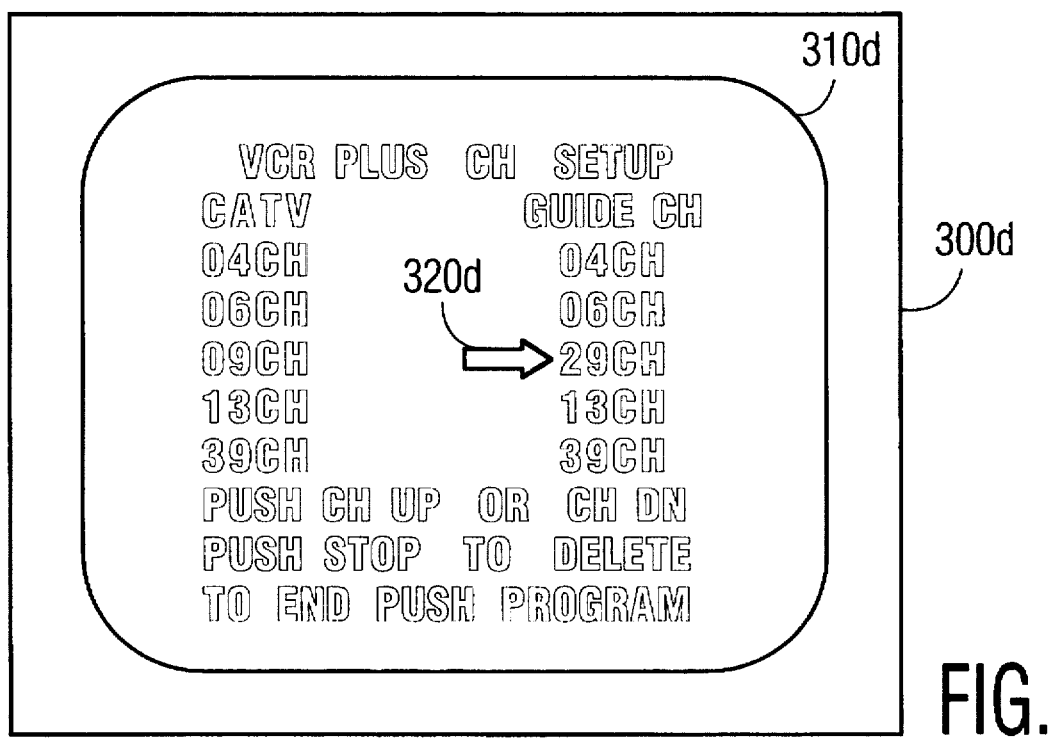

Such channel mapping means is shown in FIGS. 3c and 3d. An arrow 320c is shown pointing to the line containing the channel number to be remapped. The direction of the arrow indicates which column entry will be changed. FIG. 3c shows the entries before the change, and FIG. 3d shows the entries after the change (i.e., after the channel 29 data is entered).

Figure 2:
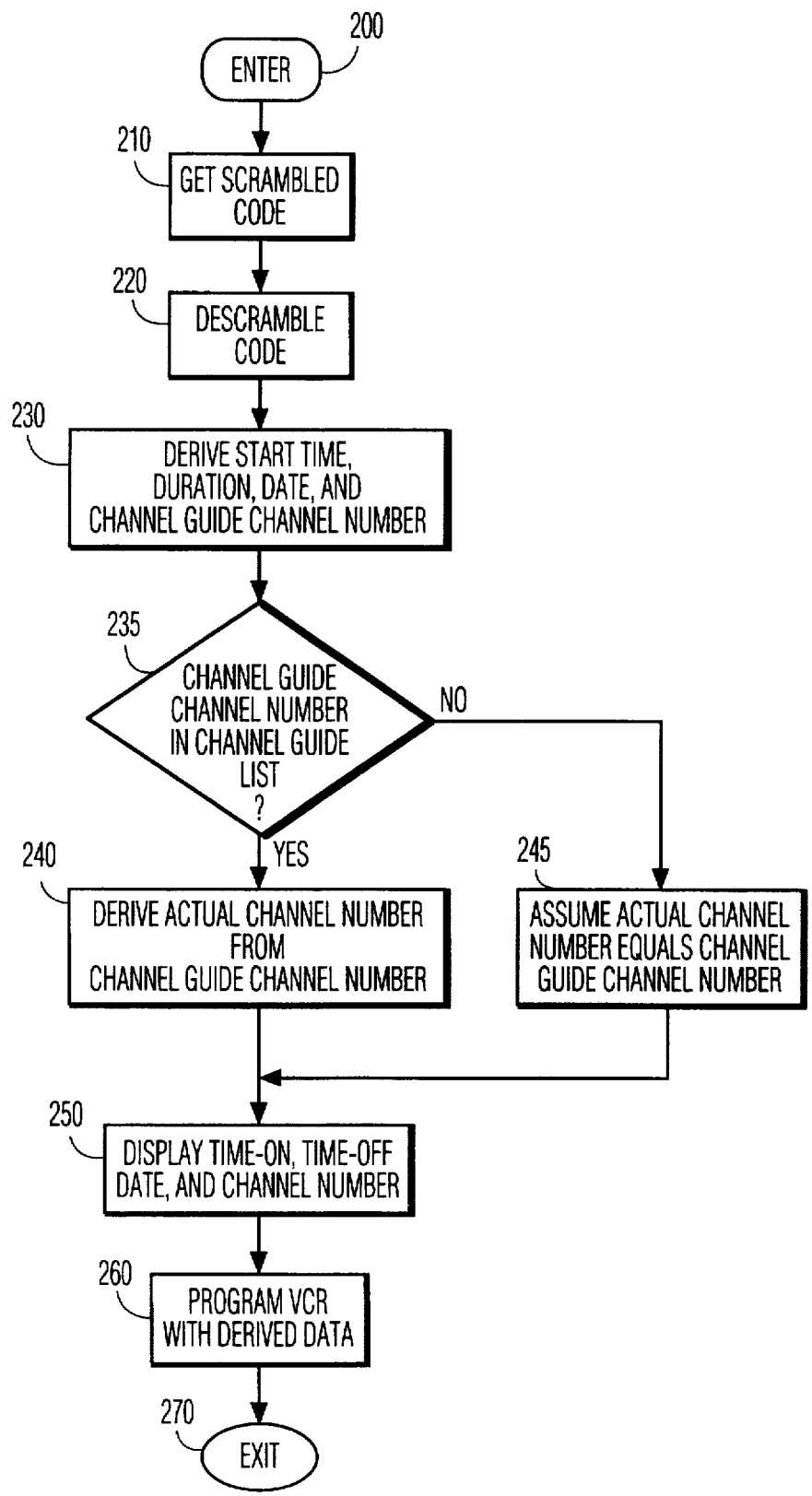
FIG. 2 is a flowchart showing a portion of the control program of the controller of FIG. 1.

As a result of the channel mapping operation, when the channel guide channel number 29 is descrambled and decoded from the "VCR PLUS+™" videocassette recorder programming system code, tuner 102 will be controlled to tune to cable channel 09, on the proper date, at the proper time the basic operation for descrambling and decoding an entered "VCR PLUS+™" videocassette recorder programming system code is shown in FIG. 2. Referring to FIG. 2, a scrambled code of the "VCR PLUS+™" videocassette recorder programming system is received at element 210 and descrambled at element 220. All the elements of FIG. 2 with the exception of elements 235 and 245 are known from the previous implementation of the "VCR PLUS+™" videocassette recorder programming system. Elements 235 and 245 will be discussed in detail below.

A further advantage of the subject apparatus over the previous implementation of the "VCR PLUS+™" videocassette recorder programming system is that the display of the "VCR PLUS+™" videocassette recorder programming system handunit comprises a single line of data, while the subject apparatus displays five lines of data on a television screen. This arrangement produces two advantages. First, it presents the user with five times as much channel mapping information at any given time, and second, it more effectively conveys the notion that the user is viewing a portion of a list comprising multiple entries. It is felt that both of these advantages tend to reduce user confusion.

Figure 3E:
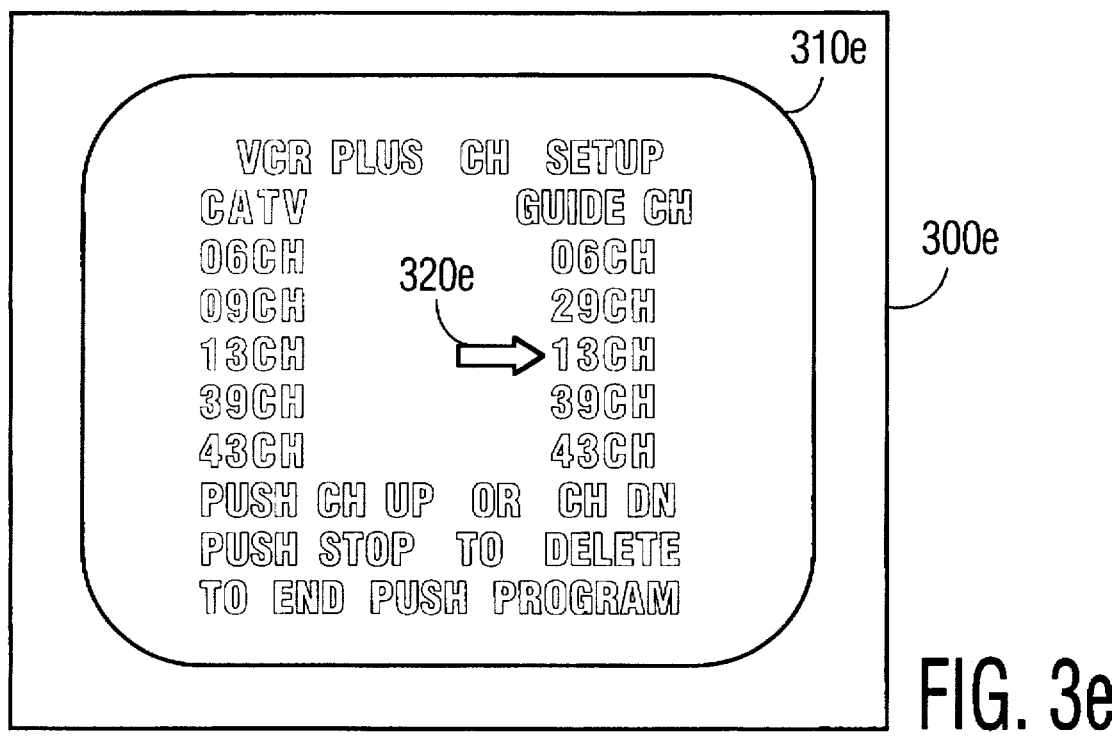
Figure 3F:
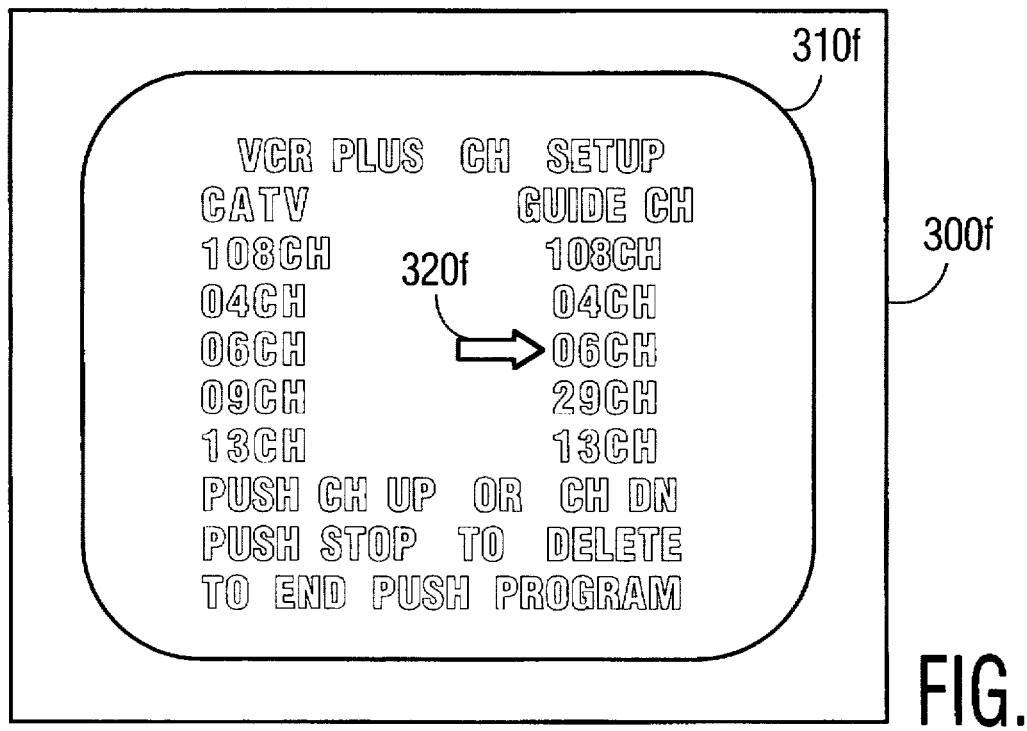

Advantageously, the subject apparatus requires no pushbuttons unique to the VCR PLUS+™ videocassette recorder programming system to be added to the VCR remote control handunit. Thus, customers with previously purchased "unified" or "universal" remote controls (i.e., those remote control handunits having the capability to control both television sets and VCRs of a given manufacturer) are be able to use them to program the subject "VCR PLUS+™" videocassette recorder programming system-equipped VCR. For example, the handunit of the "VCR PLUS+™" videocassette recorder programming system includes a REVIEW key, a key generally not found on VCR or television set remote control handunits. In order to provide the REVIEW function, yet maintain downward compatibility with existing remote control handunits, the CHANNEL UP AND CHANNEL DOWN keys are used to scroll through the channel mapping list. FIGS. 3e and 3f illustrate scrolling up and down, respectively, through the channel mapping list. Note that the indicator arrow remains stationary during the scrolling process.

Figure 3G:
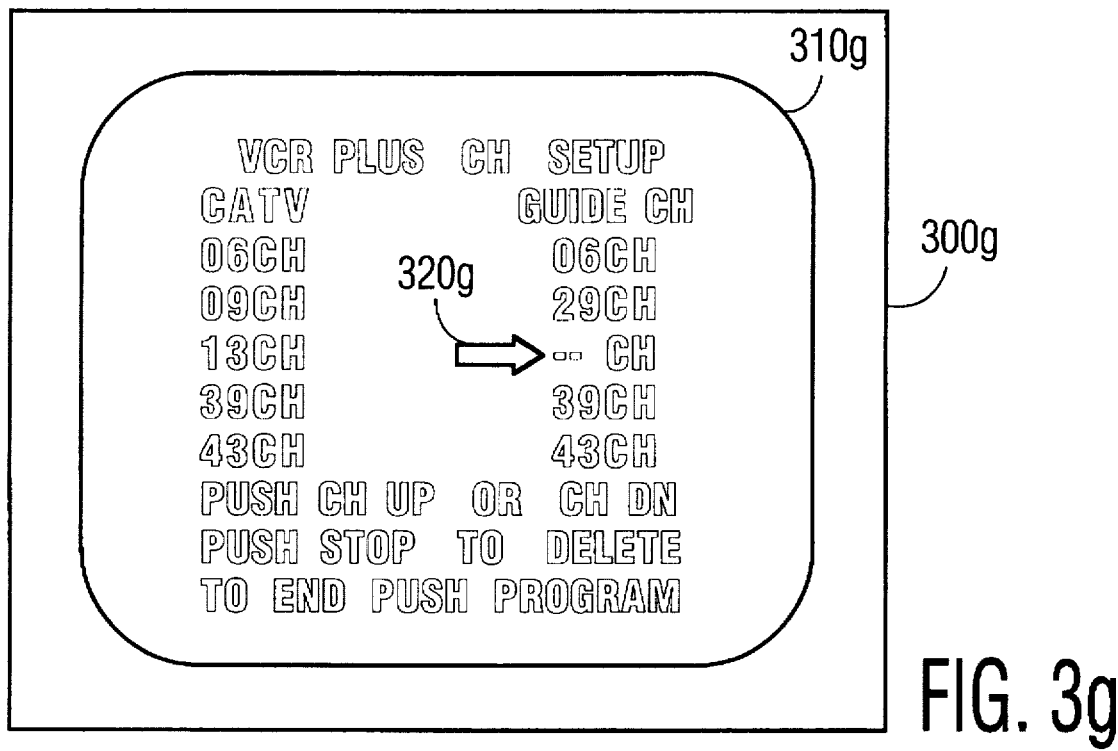
Figure 3H:
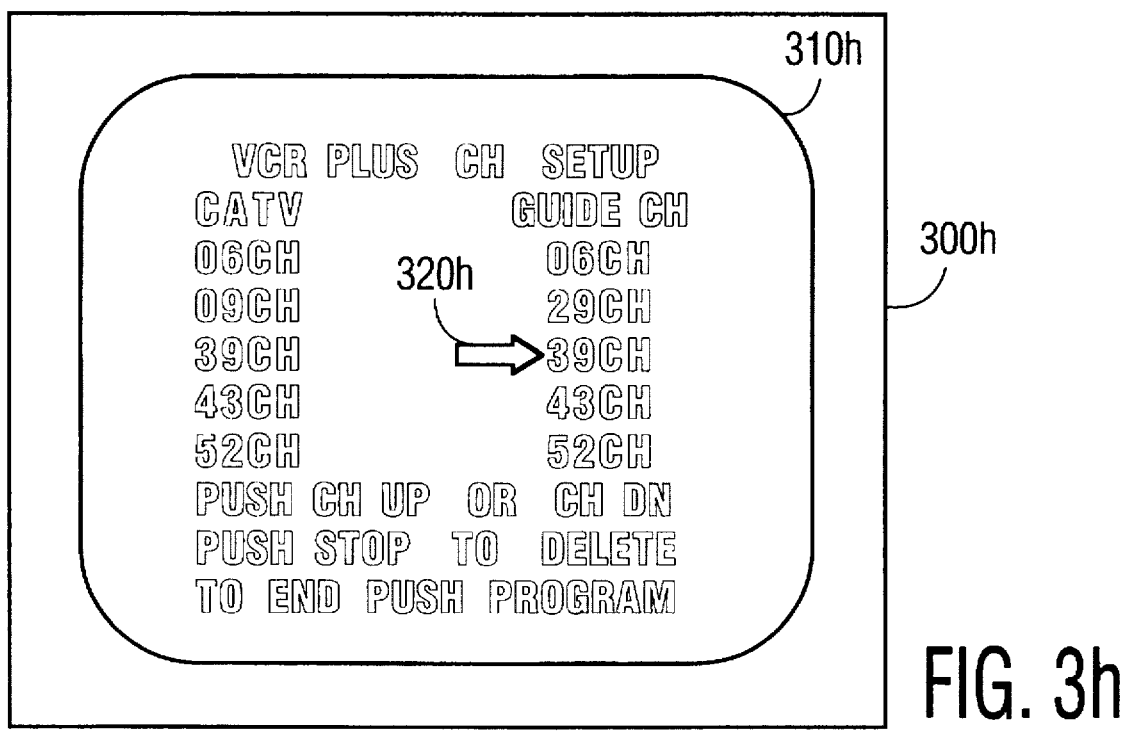

FIGS. 3g and 3h illustrate the process of deleting an entry from the guide channel list stored in EEPROM 117. In FIG. 3g, the list was scrolled until the indicator pointed to the entry to be deleted, in this case channel 13. Then the STOP key of remote control unit 125 was pressed to perform the deletion. Note that the line containing channel 13 remains on the display of FIG. 3g with the GUIDE CHANNEL entry erased (i.e., replaced by dashes). This enables the user to replace the value if the deletion was performed in error. However, if the user correctly deleted the entry, the user can complete the deletion of the entire line by simply scrolling the dashed entry off of the screen. When that portion of the list formerly containing the dashed entry is next displayed, the entire line associated with the deleted entry will be absent from the list, as shown in FIG. 3h (i.e., channel 13 entry missing). Having finished mapping all necessary channels, and deleting all channels which were undesired, the PROGRAM key is pushed to exit the "VCR PLUS+™" videocassette recorder programming SET UP routines, once again produce the screen of FIG. 3a.

Figure 3I:
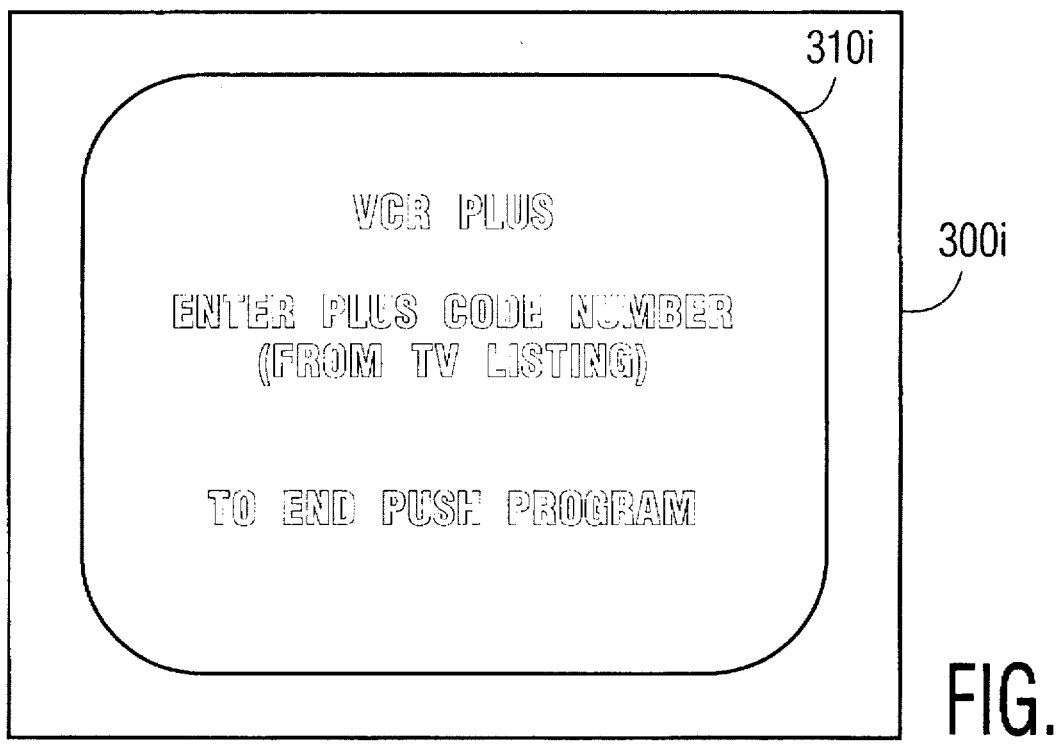
Figure 3J:
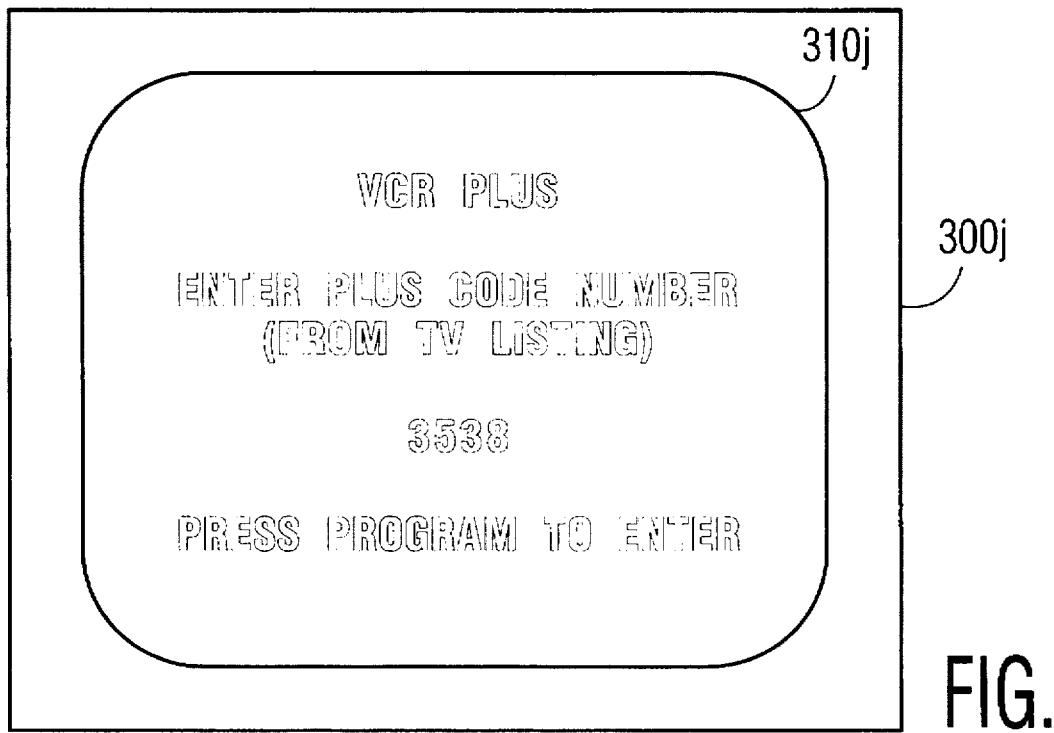
Figure 3K:
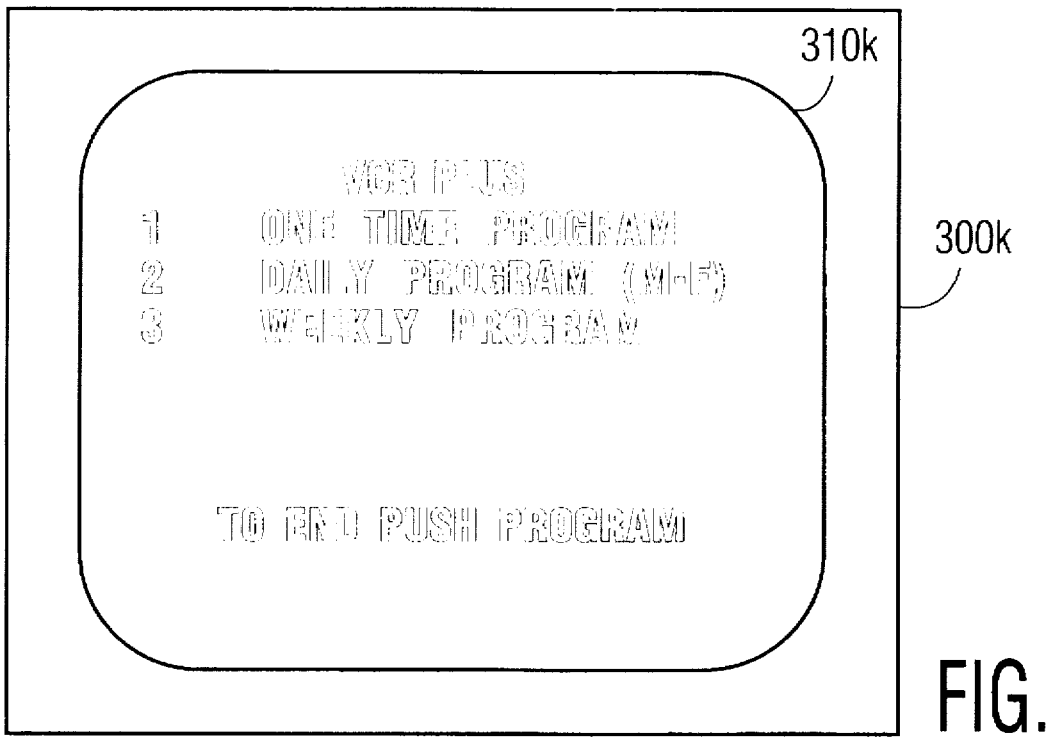
Figure 3L:
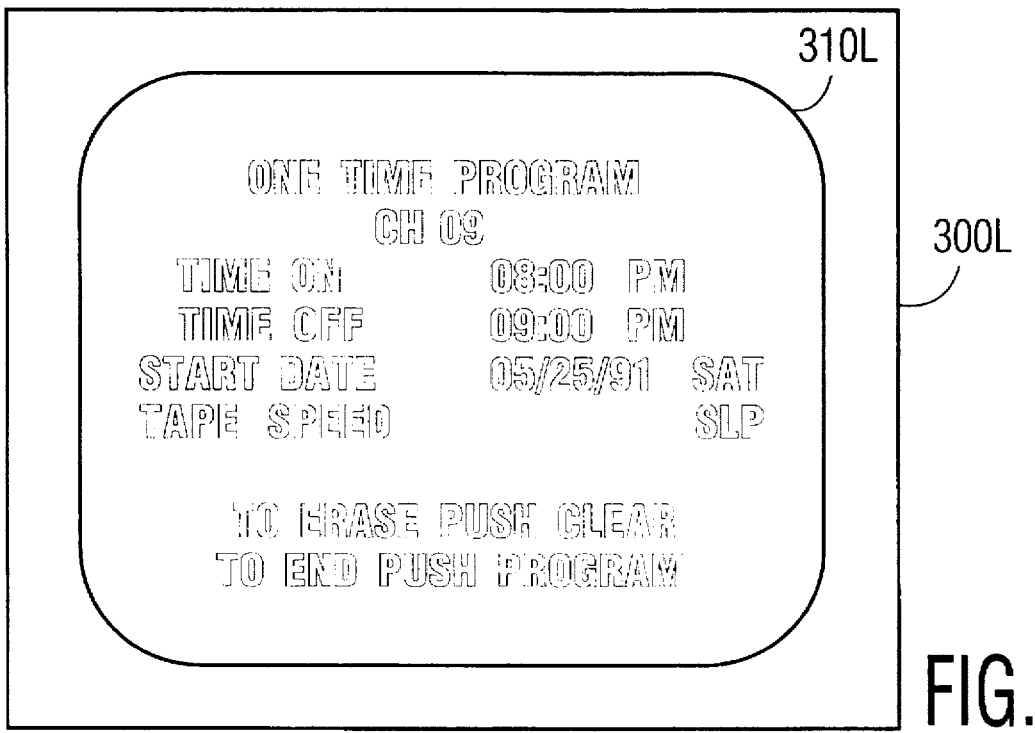

Pressing key 1 will cause the display of the screen of FIG. 3i. In FIG. 3i the user is instructed to enter the "VCR PLUS+™" videocassette recorder programming system code from his local TV listing. In FIG. 3j a particular 4 digit listing 3538 has been entered, After pressing the ENTER key of remote control unit 125, the screen of FIG. 3k is produced. The three choices of the menu screen of FIG. 3k are well known in the art, are self-explanatory, and need no further explanation here. Pressing key 1 provides the user with a filled-in schedule (FIG. 3L) derived from the information in the "VCR PLUS+™" videocassette recorder programming system code 3538. In order to avoid user confusion, the channel number displayed in the screen of FIG. 3L is the remapped channel number (in this example, channel 09) and not the channel number which appears in the newspaper listing (in this example, channel 29). One reason for this is that 09 is the channel number which this particular user would have to enter if he were programming his VCR via the TIMER PROGRAM menu. Thus, the displayed channel numbers of the two programming systems are consistent with one another.

Figure 3M:
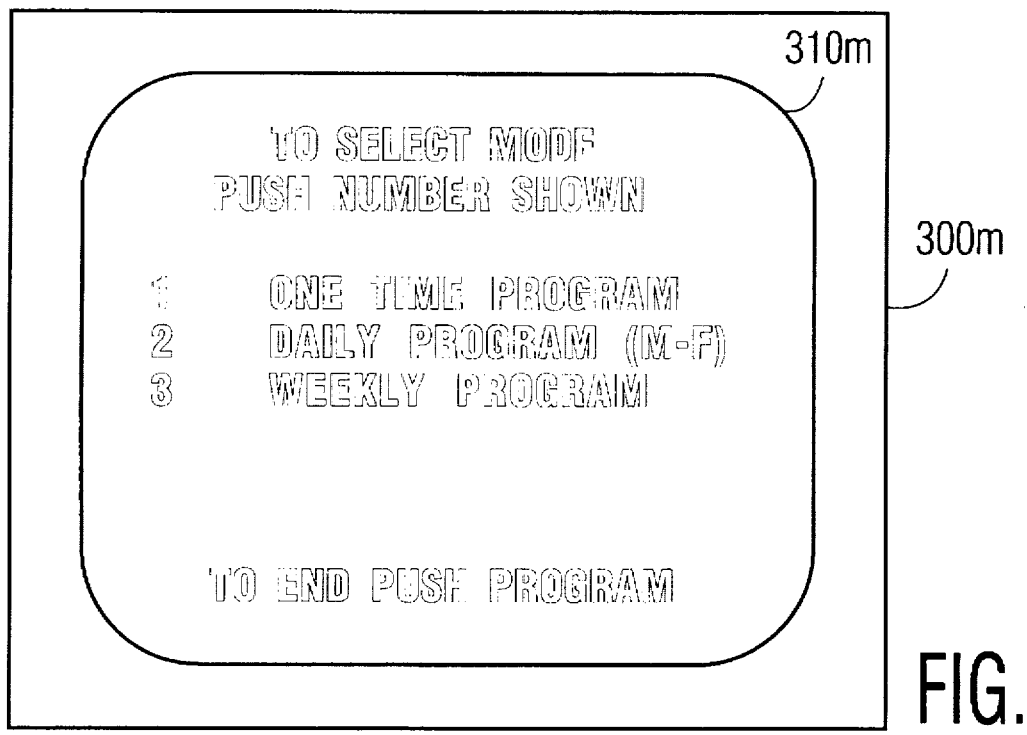
Figure 3N:
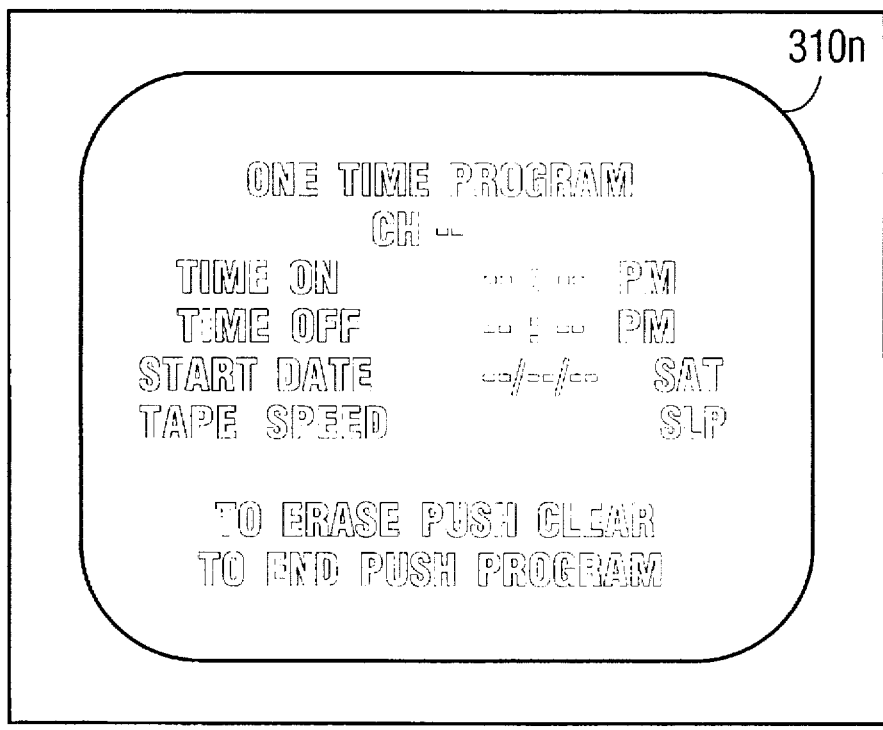

Turning once again to FIG. 3a, if the user had pressed key 2 TIMER PROGRAM, he would have caused the display of the screen of FIG. 3m, which is essentially the same as the display of FIG. 3k for the "VCR PLUS+™" videocassette recorder programming system programming example. If key 1 ONE TIME PROGRAM is pressed, then the display of FIG. 3n is produced, as is known from the prior art, for manual filling-in of the necessary data.

It is important to note that controller 110 "remembers" if "VCR PLUS+™" videocassette recorder programming system was selected for the last recording (i.e., stores data in a memory location of EEPROM 117), and if so, automatically selects "VCR PLUS+™" videocassette recorder programming system mode for the next recording. That is, the program in ROM 114 controls the display of the screens such that, if "VCR PLUS+™" videocassette recorder programming system mode was selected for the recording of the last TV show, then the next time that the PROGRAM key is pressed, the screen of FIG. 3a is skipped and the screen of FIG. 3i is the first screen displayed.

Figure 4:
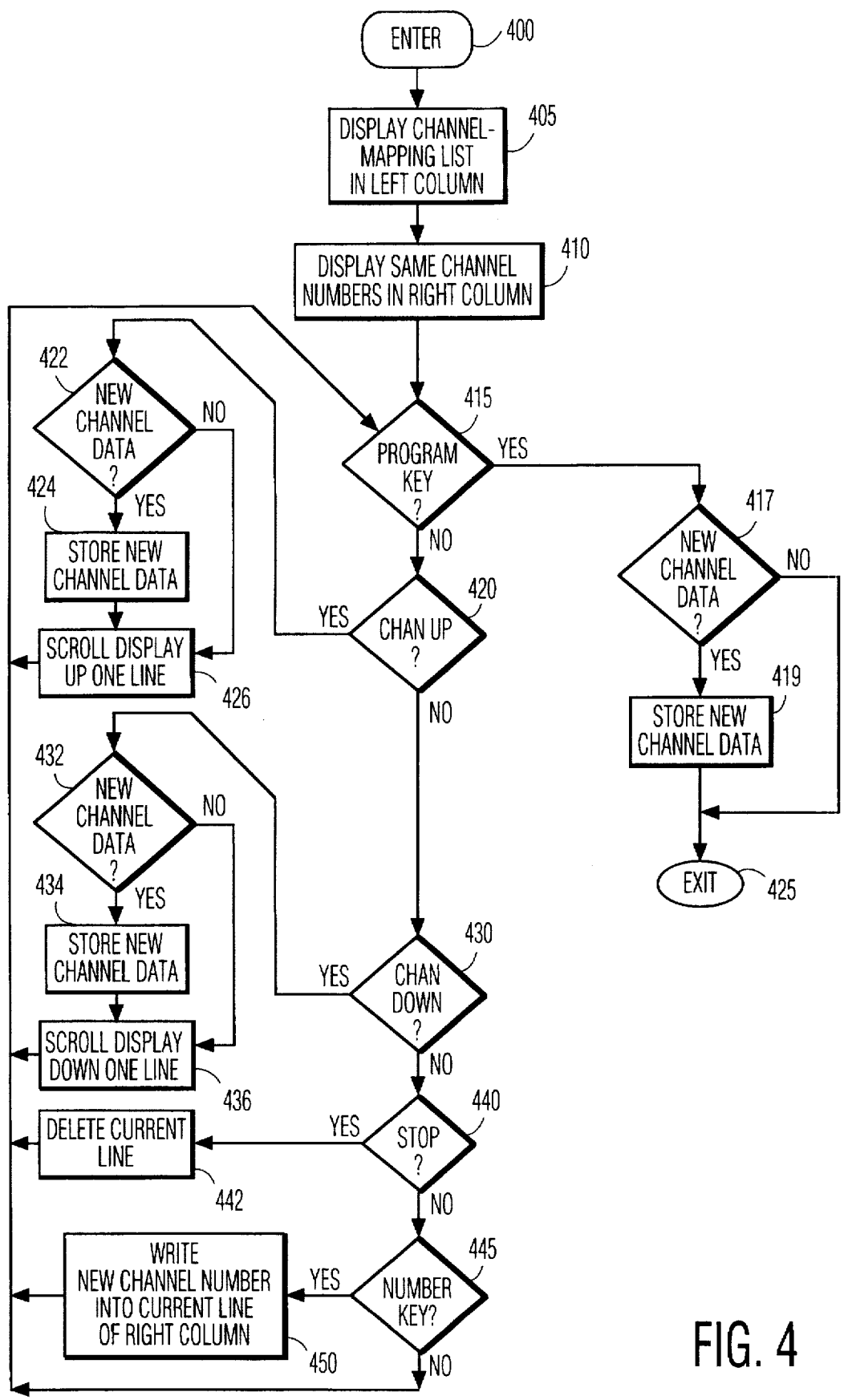
FIG. 4 is a flowchart showing the channel mapping portion of the control program of the controller of FIG. 1.

A portion of the control program for controller 110, for controlling a channel mapping operation, is illustrated in the flowchart of FIG. 4. For ease of understanding, FIGS. 4 and will be explained with reference to each other. The channel-mapping routine of FIG. 4 is entered at step 400. At step 405, the channel mapping list stored in the channel mapping list area of EEPROM 117 (shown in the righthand portion of FIG. 5) is displayed.

The addresses 505 of the channel mapping list correspond to television channels (i.e., except for channel 0 in the United States). Each memory location of the channel mapping list comprises eight bits of memory. Seven-bit portions (designated 520 in FIG. 5) are used for storing the channel guide channel number (0 to 125) and the eighth bit (designated 510) is used to indicate whether or not the channel is active or to be skipped. The lefthand column of memory locations of FIG. 5 contains the autoprogramming channel scan list. Each location of the autoprogramming channel scan list comprises eight bits of memory (b0–b7) for designating active or skip status for each of eight particular channels. Bit 0 of memory location 0 corresponds to channel 0, an invalid channel number, and contains an X to illustrate a "don't care" condition. The same is true for channel numbers 126 and 127, which are not supported in this embodiment. When an autoprogramming sequence is performed, both the autoprogramming channel scan list and the channel mapping list are automatically programmed to contain identical channel data regarding active channel status. Thereafter, both lists may be modified independently of each other.

It is important to note-that if the user moves to a new geographic area, his autoprogramming channel scan list and channel mapping list must be updated for the active channels in his new area. The task of reprogramming the user's VCR is eased by the subject apparatus because choosing the AUTOPROGRAM feature from the menu of FIG. 3b automatically reprograms both the autoprogramming scan list and the channel mapping list at essentially the same time. Additional channels added to the autoprogramming scan list (i.e., via the ADD/ERASE function from the menu screen of FIG. 3b, or via ADD/ERASE keys (not shown) of remote control handunit 125) will automatically be added to the channel mapping list. However, channels deleted from the autoprogramming scan list (i.e., via the ADD/ERASE function from the menu screen of FIG. 3b, or via ADD/ERASE keys (not shown) of remote control handunit 125) will not automatically be deleted from the channel mapping list. To understand the reasoning behind this method of operation, recall that if a channel is programmed into the autoprogramming scan list, then the tuner will always stop at that channel when scanning down from the next higher channel, or when scanning up from the next lower channel with the CHANNEL DOWN and CHANNEL UP keys, respectively. If a particular channel is seldom watched, the user may wish to delete it from the autoprogramming scan list to prevent it from being tuned during channel scans. In addition, a cable television subscriber may delete the so-called "Premium" channels from his autoprogramming scan list because those channels often convey movies which he may feel are not suitable for viewing by children. Deleting those channels from the autoprogramming scan list causes the tuner to skip those channels during a scan, but they can still be tuned by direct channel number entry. Furthermore, it is felt that a viewer should still be able to record a specific television show on that particular seldom-watched channel, via VCR PLUS™ programming, even though it is not programmed into his autoprogramming scan list.

Returning to FIG. 4, as noted above, the control program in program ROM 114 assumes a one-to-one correspondence of active channels to channel guide channels unless otherwise informed. Thus in step 405, the same channel number data is displayed in the righthand channel guide column as shown in FIG. 3c. The control program now begins to look for keyboard entries from the user. At step 415, a determination is made if an entered keycode is that of the PROGRAM key. As can be seen from FIG. 3c, the PROGRAM key is used to exit the channel mapping routine. If the keycode is that of the PROGRAM key, then the routine advances to step 417 wherein a determination is made as to whether or not new channel data has been entered. If so, the new channel data is stored (step 419) and the routine is exited. If not, the routine is exited at step 425.

If at step 415, the received keycode was not that of the PROGRAM key, then the NO path is taken to step 420, wherein a check is made to see if the received keycode is the CHANNEL UP keycode. The control program interprets a CHANNEL UP or CHANNEL DOWN command as an indication that the user is finished modifying the current line. Note that because of this interpretation, there is no need for an ENTER key (which is not present on all existing remote control handunits). Therefore, at step 422 a check is made to see if new channel data has been entered. If so, the new channel data will be stored (step 424), and then the display will be scrolled up one line (step 426). If not, the routine will advance directly to step 426 for scrolling the display up. The routine then loops around to step 415 to continue examining received keycodes.

If at step 420, the received keycode was not that of CHANNEL UP, the routine advances to step 430 to check whether or not the received keycode is that of CHANNEL DOWN. If yes, the routine advances to step 432 wherein a check is made to see if new channel data has been entered. If so, the new channel data will be stored (step 434), and then the display will be scrolled down one line (step 436). If not, the routine will advance directly to step 436 for scrolling the display down. The routine then loops around to step 415 to continue examining received keycodes.

If at step 430, the received keycode was not that of CHANNEL DOWN, the routine advances to step 440 to check whether or not the received keycode is that of the STOP key. If so, The current line is deleted. As noted above, this means that two dashes replace the data in the display of the channel mapping list, as shown in FIG. 3g. As explained above, if the display is then scrolled to a position in which the dashes are off screen, then the entire line is deleted. Thereafter, scrolling the display back to its original position reveals a display screen in which the entire previously-dashed line is deleted. Conversely, if desired, the program may be written to maintain the dashed entry, to enable easy reprogramming of the deleted line of channel information. After replacing the previously-displayed data with dashes, the routine exits from step 442 and loops around to step 415 to continue examining received keycodes.

If the keycode at step 440 did not correspond to that of the STOP key, then the NO path is taken to step 445 wherein a check is made to see if the received keycode is that of any number key. If not, then it corresponds to an irrelevant code and will be ignored by the routine. In that case, the routine loops around to step 415 without taking any action. In other embodiments, the particular action associated with the received keycode (e.g., volume down) can be accomplished, and thereafter the channel mapping routine can be resumed, or terminated. If the received keycode is that of any of the number keys, then the YES path is taken to step 450. At step 450, new channel data corresponding to the received keycode is displayed at the current line, as shown in FIG. 3d, and then the routine loops around to step 415.

With respect to the decision diamonds of steps 417, 422, and 432, it is noted that the EEPROM used has a recommended maximum number of write cycles, and it was felt that it is prudent to check to see if the channel data has been changed rather than waste a write cycle by needlessly storing unchanged data. It is recognized that such a check would be unnecessary with a storage medium having a virtually unlimited number of write cycles.

Deletion of entries in the channel guide list via use of the STOP key is desirable because, unfortunately, the autoprogramming function may find spurious channels and list them as active channels. If so, they will appear in the autoprogramming scan list and be mapped into the channel guide list with a one-to-one correspondence. This may cause the following problem. Assume a cable television service in which cable channel 13 is inactive, but has a spurious signal which is detected by the autoprogramming function thereby falsely identified as an active cable channel. This causes channel 13 to appear in both the autoprogramming scan list and the channel guide list. Further assume that channel 13 is an active broadcast channel delivered by the cable service on cable channel 22. In order to remap broadcast channel 13 to cable channel 22, the user will scan down to the line of the autoprogramming scan list containing channel 22, and change the corresponding channel guide channel number to 13. However, as noted above, channel 13 was falsely identified as an active cable channel, and was automatically mapped in a one-to-one correspondence to channel 13 of the channel guide list. In such a situation, the channel guide list has two entries of channel 13. When a "VCR PLUS+™" videocassette recorder programming system code for channel 13 is entered by a user, it will be descrambled and decoded, and then a search of the channel guide list for a channel 13 entry will be performed from the top down. Note that the first entry of channel 13 to be found will be the falsely identified cable channel 13, and not the correct entry remapped to channel 22. This will cause the tuner to tune to inactive cable channel 13 instead of cable channel 22, and the desired television show will not be recorded. In order to solve this problem, the user must delete the first, incorrect, entry of channel 13 from the channel guide list.

As a further example, assume that cable channel 02 was deleted from the channel-guide list because it was inactive when the "VCR PLUS+™" videocassette recorder programming system set up was performed. Assume further that at a later date channel 02 is added to the cable television service's system. If the "VCR PLUS+™" videocassette recorder programming system code for a television show broadcast on channel 02 is thereafter entered by a user, channel 02 will be descrambled and decoded but will not be found in the channel guide list (see element 235 of FIG. 2). Therefore, a one-to-one correspondence of broadcast channel number to channel guide number will be assumed, as shown in element 245 of FIG. 2, and channel 02 will be tuned for recording, even though the channel 02 entry was deleted previously.

Thus, there has been described, a videocassette recorder including "VCR PLUS+™" videocassette recorder programming system capability and autoprogramming capability, wherein the channel-mapping procedure is greatly simplified by using the autoprogramming feature to locate and program all active channels, and then by mapping only those channels which are active. It is noted that in actual practice, most cable television services supply approximately 30 active cable channels. Therefore, with the subject apparatus, a user need only select those 30 or so active channels for possible remapping, instead of having to step through all inactive channels as well, up to the maximum of 125 possible channel-programming positions.

What is claimed is:

1. A videocassette recorder, comprising:

tuner means for selecting a particular RF signal from a group of RF signals in response to a control signal, said RF signals corresponding to television channels;

control means for generating said control signal for causing said tuner means to select said particular RF signal;

means, coupled to said control means, for entering data in response to operation by a user; and memory means for storing channel related data;

said control means in response to said data entered by said user causes said tuner means to automatically tune to each of said television channels, said control means storing in said memory means autoprogramming data indicative of each active channel detected;

said control means including programming means for receiving an entry of a numeric code for programming said videocassette recorder to tune to a specific channel on a specific time and date and record a received television signal for a specific duration of time, said control means decoding said numeric code to produce a specific channel guide number of a plurality of channel guide numbers;

said control means using said autoprogramming data in a first mode for skipping inactive channels in response to a channel up or channel down command, and in a second mode for storing said active channel data for channel remapping during a set-up mode for said programming means;

said control means using said autoprogramming data for generating a display of a first list of only said active channels and a second list of said channel guide channel numbers, said first and second lists having an equal number of entries, and in response to said data entered by said user, performing said remapping of channels by changing one of said channel guide channel numbers to a predetermined channel number in order to associate it with one of said displayed active channel numbers; and in response to said decoded particular channel guide channel number, said control means retrieves said associated active channel number;

said control means causing said tuner means to tune to said associated active channel on said specific time and date and causing the recording of a television signal for said specific duration of time.

2. The videocassette recorder of claim 1, wherein said control means initially assigns a one-to-one correspondence of an active channel number to a channel guide channel number and maintains said initial assignment until said active channel number is associated with a channel guide channel number.

3. The videocassette recorder of claim 2, wherein said numeric code for programming said videocassette recorder is a code of the VCR PLUS+™ programming system.

4. A videocassette recorder, comprising:

tuner means for selecting a particular television channel from a group of television channels in response to a control signal;

control means for generating said control signal for causing said tuner means to select said particular television channel;

means, coupled to said control means, for entering data in response to operation by a user; and memory means for storing channel-related data;

said control means causes said tuner means to automatically tune to each of said television channels, said control means determining which of said television channels are active channels, and storing autoprogramming data indicative of said active channels in an active channel list in said memory means;

said memory means also storing a list of channel guide channel numbers;

said autoprogramming data being used by said control means in a first mode for skipping inactive channels in response to a channel up or channel down command, and in a second mode for storing said active channel data for remapping during a set-up mode for said programming means;

said control means using said autoprogramming data in said set-up mode to display said active channel list and a list of said channel guide channels, said active channel list and said displayed channel guide channel list having the same number of entries, and in response to data entered by said user said control means associates an entry in said channel guide list with a respective one of said displayed active channels by modifying said entry in said channel guide list; and said control means in response an entry of a particular channel guide channel number, causes said tuner means to tune to said associated active channel instead of said to one of said channel guide channels when recording a television signal on a specific time and date for a specific duration of time.

5. A videocassette recorder for use with a cable television system, comprising:

tuner means for selecting a particular cable television channel from a group of cable television channels in response to a control signal;

control means for generating said control signal for causing said tuner means to select said particular cable television channel;

means, coupled to said control means, for entering data in response to operation by a user; and memory means for storing channel-related data;

said control means causes said tuner means to automatically tune to each of said cable television channels, said control means determining which of said cable television channels are active channels, and storing autoprogramming data indicative of said active channels in an active cable television channel list in said memory means;

said memory means also storing a list of channel numbers of broadcast television stations;

said control means using said autoprogramming data in a first mode for skipping inactive channels in response to a channel up or channel down command, and in a second mode for causing a display of a list of said active cable channel data and a list of said channel numbers of broadcast television stations for remapping during a set-up mode for said programming means, the length of said active cable channel list determining the length of said list of channel numbers of broadcast television stations, and said control means in response to data entered by said user associates an entry in said broadcast television station list with said displayed active cable television channel list by changing said entry in said broadcast television station list to a predetermined channel number, and thereafter in response an entry of a particular broadcast television station channel number, said control means causes said tuner means to tune to said associated active cable channel.

6. A method for programming a VCR, comprising the steps of:

performing an autoprogramming function to identify active cable television channels and store active cable channel data in an autoprogramming list;

storing a list of channel numbers of broadcast television stations;

using said autoprogramming list in a first mode for skipping inactive channels in response to a channel up or channel down command, and in a second mode for displaying said autoprogramming list and a list of equal length of said broadcast television channels;

reading data entered by a user and in response to said user-entered data associating an entry in said broadcast television station list with said displayed active television channel number by changing said entry in said broadcast television station list to a predetermined channel number; and, storing a map comprising data relating said active cable television channels and said broadcast television channels.

7. Apparatus for programming a VCR, comprising:

tuner means for tuning television channels;

control means for causing said tuner means to perform an autoprogramming function to identify active television channels by controlling said tuner means and for storing active channel data in a list;

display means for displaying said stored active channel data during a remapping procedure; and means, including a memory for storing a map comprising data relating said active channels and a group of broadcast television channels;

said control means using said active channel data in a first mode for skipping inactive channels in response to a channel up or channel down command, and in a second mode for remapping said broadcast channels to said active channels during a set-up mode by starting from said active channel data in order to display a list of said stored active channel numbers;

said control means, in response to said data entered by said user, performing said remapping of channels by changing a broadcast television channel number to a predetermined channel number in order to associate said predetermined channel number with one of said displayed active channel numbers.

* * * * *